P. S. REDFIELD.
FISHING-FLOAT AND SINKER ATTACHMENT.

No. 188,755. Patented March 27, 1877.

WITNESSES.
William B. W. Hallett
Warren R. Perce

INVENTOR.
Paul S. Redfield

UNITED STATES PATENT OFFICE.

PAUL S. REDFIELD, OF PROVIDENCE, RHODE ISLAND.

IMPROVEMENT IN FISHING FLOAT AND SINKER ATTACHMENTS.

Specification forming part of Letters Patent No. 188,755, dated March 27, 1877; application filed December 30, 1876.

*To all whom it may concern:*

Be it known that I, PAUL S. REDFIELD, of the city and county of Providence, in the State of Rhode Island, have invented a new and Improved Attachment for Sinkers and Floats; and declare the following to be a specification thereof, reference being had to the accompanying drawings.

Like letters indicate like parts.

Figure 1:
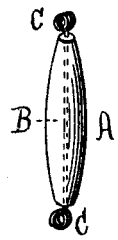
Figure 2:
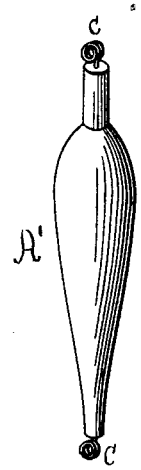
Figure 3:

Figure 1 is a perspective view of my invention as applied to a sinker. Fig. 2 is a perspective view of my invention as applied to a float. Fig. 3 shows the attachment separately.

My invention is designed for use upon sinkers or floats of fishing-tackle; and consists, essentially, in fitting at the ends of the articles a close spiral coil of wire, to hold by compression the line between the adjacent coils. The sinker or float may thus be readily fastened to the line at any desired point, and may be easily detached at pleasure. As the wire is elastic the adjacent coils compress the inclosed line, and thus secure it firmly. The hook or bait need not be disturbed or removed at all. If for any cause the position of the sinker or float needs to be changed—as, for example, in fishing in waters of different depths—they can be removed and adjusted again independently of the remainder of the tackle, or can be slid along the line to the proper place.

The sinker A or float A' is made of any suitable material, and in any form, as may be desired. The wire B is of spring or other wire, the end of which is coiled spirally two or more turns, the coils lying snugly together, as shown at C. The peculiar construction is shown enlarged in Fig. 3. The wire may have a single attachment or coil, C, as in Fig. 3, and be inserted at the respective ends of the sinker or float; or the wire may pass through the sinker from end to end, as shown in Fig. 1, terminating at each extremity with the coil C. In a sinker the latter method is preferable, because it can be readily cast upon the wire in a mold.

It is apparent that this method of attaching a line to an object may be used in other cases than above stated.. An article or thing of comparatively light weight secured to a line can be conveniently removed or replaced at will, so long as the elasticity of the coil has sufficient power to compress the line to prevent slipping. Such a use, however, would obviously be within my invention.

Instead of a spring-wire, hard or annealed wire may also be used with advantage, as in small coils these wires possess a certain elasticity.

I am aware that the tips of a float-shaft have heretofore been provided with spirally-coiled wires, through which coil the line passes after being wound or coiled about the float several times, to prevent slipping and to give the requisite tension; but this I do not claim. By the employment of my improved attachment it is not necessary to wind the line around the float, as it is held firmly between the close elastic coils by compression, in such a manner as not to interfere with its tension, while obviating all liability to its slipping or becoming detached.

What I claim as new, and desire to secure by Letters Patent, is—

1. The fastening attachment herein described, consisting of the wire B, terminating at one end in a close elastic spiral coil, C, arranged at a right angle or transversely to the longitudinal axis of the float or sinker, substantially as and for the purpose specified.

2. The sinker A, in combination with the wire attachment B, having a close elastic spiral coil, C, whereby the line is held firmly by compression, substantially as described.

3. The float A', in combination with the wire attachment B, provided with a close elastic spiral coil, C, substantially as and for the purpose set forth.

PAUL S. REDFIELD.

Witnesses:
 WILLIAM B. N. HALLETT,
 WARREN R. PERCE.